(12) United States Patent
Van Der Zee

(10) Patent No.: US 10,428,800 B2
(45) Date of Patent: Oct. 1, 2019

(54) MODULAR SYSTEM FOR TRANSPORTING WIND TURBINE BLADES

(71) Applicant: LM WP PATENT HOLDING A/S, Kolding (DK)

(72) Inventor: Jacobus J Van Der Zee, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 15/326,372

(22) PCT Filed: Jul. 17, 2014

(86) PCT No.: PCT/EP2014/065405
§ 371 (c)(1),
(2) Date: Jan. 13, 2017

(87) PCT Pub. No.: WO2016/008530
PCT Pub. Date: Jan. 21, 2016

(65) Prior Publication Data
US 2017/0211548 A1    Jul. 27, 2017

(51) Int. Cl.
*B60P 3/40* (2006.01)
*F03D 13/40* (2016.01)
(Continued)

(52) U.S. Cl.
CPC ............... *F03D 13/40* (2016.05); *B60P 3/40* (2013.01); *B60P 7/12* (2013.01); *B61D 3/16* (2013.01);
(Continued)

(58) Field of Classification Search
CPC .......... F03D 13/40; F03D 1/0675; B60P 3/40; B60P 7/12; F05B 2260/02; B61D 45/00;
(Continued)

(56) References Cited

U.S. PATENT DOCUMENTS

| 8,753,050 B2 * | 6/2014 | Cyrus | B60P 3/40 |
| | | | 410/120 |
| 9,011,054 B2 * | 4/2015 | Thomsen | F03D 13/40 |
| | | | 410/120 |
| 2014/0369779 A1* | 12/2014 | Randall | B60P 3/40 |
| | | | 410/45 |

FOREIGN PATENT DOCUMENTS

| EP | 1010631 B1 | 12/2004 |
| EP | 1387802 B1 | 9/2005 |

(Continued)

*Primary Examiner* — Stephen T Gordon
(74) *Attorney, Agent, or Firm* — Nath, Goldberg & Meyer; Jerald L. Meyer; Tanya E. Harkins

(57) ABSTRACT

A modular system for transporting wind turbine blades in at least two different spatial arrangements comprising two or more root end transport frames having a height H for supporting the root end, wherein H<D (D=bolt circle diameter), and two or more first tip end transport frames having a height H1 for supporting the blade towards the tip end, each first tip end transport frame has a base frame and a support bracket provided on top of the base frame, wherein each first tip end transport frame is stackable on top of a root end transport frame and vice versa, so the system is operable to stack successive blades in an alternating root end to tip end arrangement. The first tip end transport frame is replaceable with a second end transport frame that increase the inter-blade spacing, or with a tip end or a root end distance piece.

24 Claims, 9 Drawing Sheets

Figure 1:
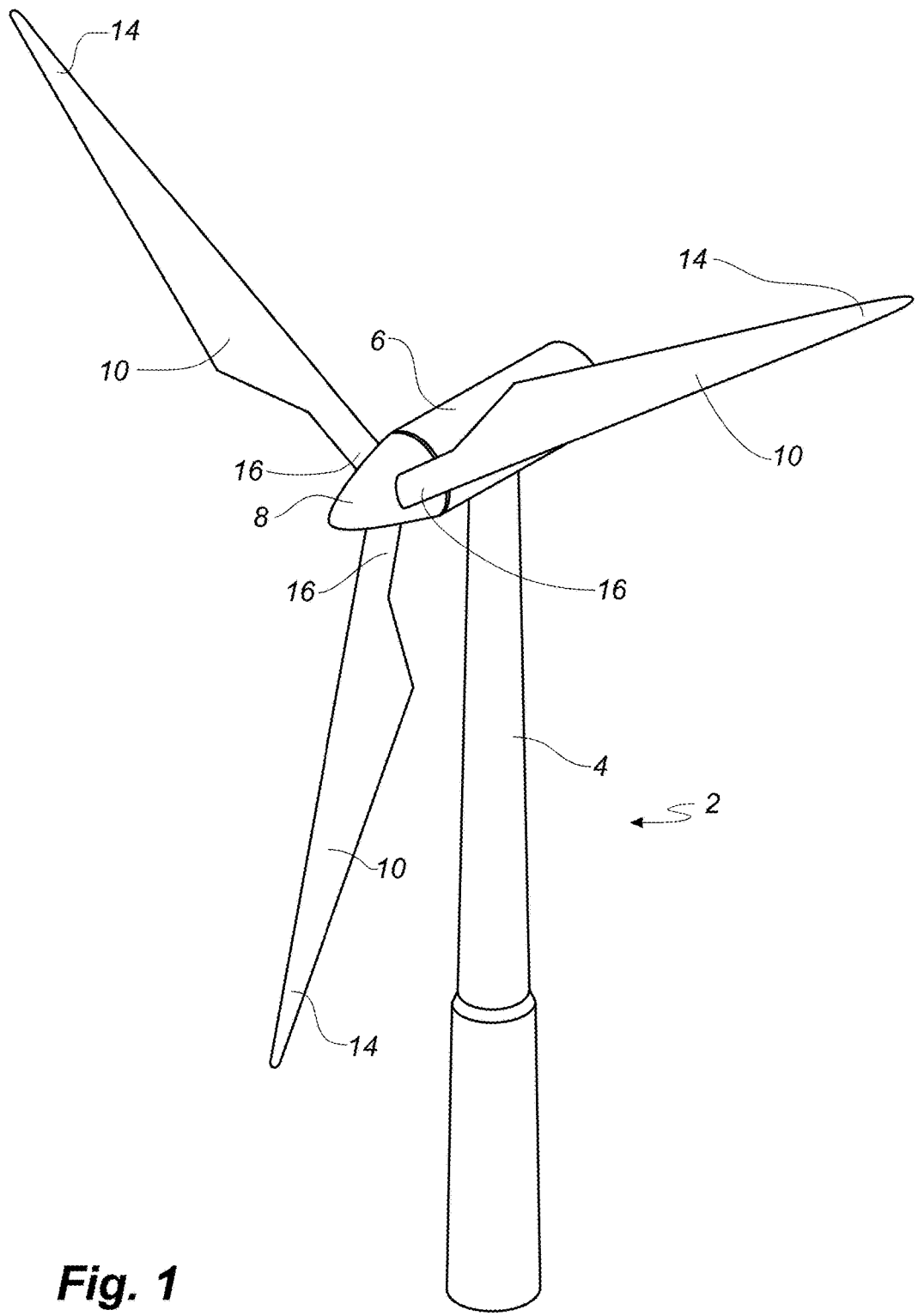

(51) Int. Cl.
  *B61D 45/00* (2006.01)
  *B60P 7/12* (2006.01)
  *B63B 25/28* (2006.01)
  *B61D 3/16* (2006.01)
  *B63B 25/00* (2006.01)
  *B61D 3/20* (2006.01)
  *B65D 88/12* (2006.01)
  *B64D 9/00* (2006.01)
  *B65D 90/00* (2006.01)
  *F03D 1/06* (2006.01)

(52) U.S. Cl.
  CPC ............ *B61D 3/20* (2013.01); *B61D 45/00* (2013.01); *B61D 45/001* (2013.01); *B61D 45/003* (2013.01); *B61D 45/007* (2013.01); *B63B 25/00* (2013.01); *B63B 25/004* (2013.01); *B63B 25/28* (2013.01); *B64D 9/003* (2013.01); *B65D 88/12* (2013.01); *B65D 88/121* (2013.01); *B65D 90/0073* (2013.01); *F03D 1/0608* (2013.01); *F03D 1/0675* (2013.01); *F05B 2260/02* (2013.01); *Y02E 10/721* (2013.01)

(58) Field of Classification Search
  CPC .. B61D 45/001; B61D 45/003; B61D 45/007; B61D 3/16; B61D 3/20; B63B 25/00; B63B 12/004; B63B 25/28; B64D 9/003; B65D 88/12; B65D 88/121; B65D 90/0073
  USPC ............ 410/32, 34, 44, 45, 53, 155; 280/404
  See application file for complete search history.

(56) References Cited

FOREIGN PATENT DOCUMENTS

| EP | 1997681 A2 | 12/2008 |
|----|------------|---------|
| EP | 2669506 A1 | 12/2013 |
| EP | 2708731 A2 | 3/2014 |
| WO | 2005005286 A1 | 1/2005 |
| WO | 2011076238 A1 | 6/2011 |
| WO | 2014064247 A1 | 5/2014 |

* cited by examiner

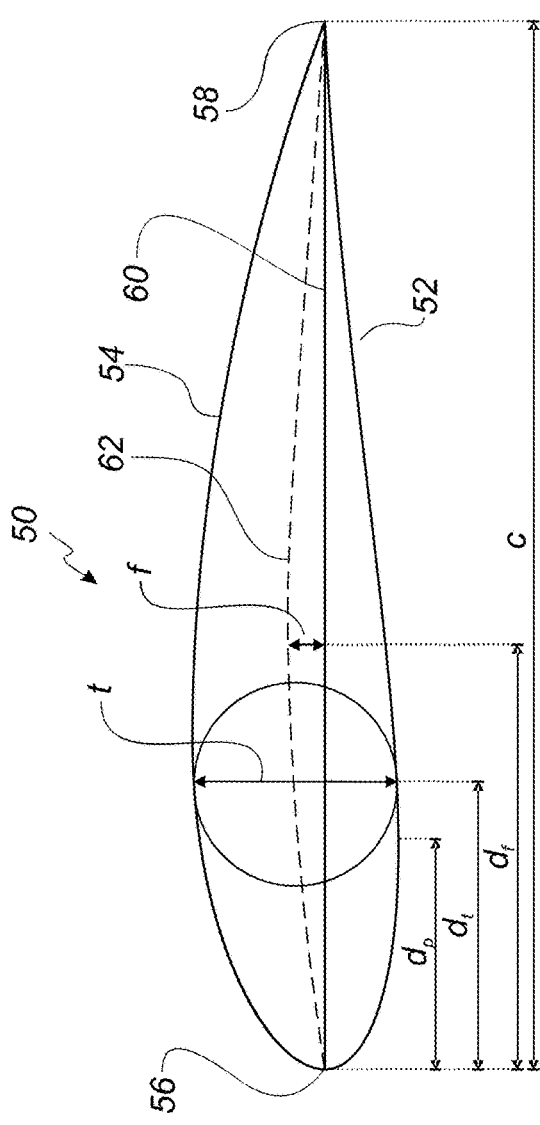
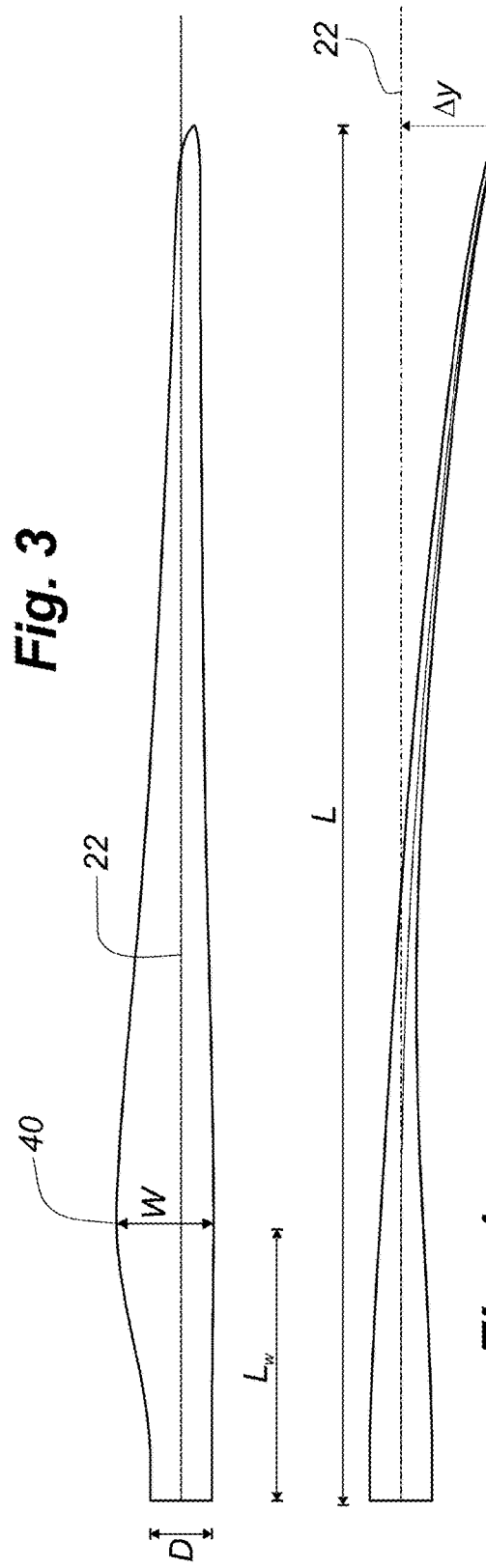
Fig. 3
Fig. 4

MODULAR SYSTEM FOR TRANSPORTING WIND TURBINE BLADES

This is a National Phase Application filed under 35 U.S.C. 371 as a national stage of PCT/EP2014/065405, filed Jul. 17, 2014, the content of which is hereby incorporated by reference in its entirety.

FIELD OF THE INVENTION

The present invention relates to a modular system for transporting wind turbine blades and to a use of the system for providing a suitable spatial arrangement of at least two wind turbine blades for transport. The present invention also relates to a transport system for transporting wind turbine blades in at least two different spatial arrangements.

BACKGROUND OF THE INVENTION

Wind turbine blades used for horizontal axis wind turbines for generating electrical power from wind can be rather large and may exceed 70 meters in length and 4 meters in width. The blades are typically made from a fibre-reinforced polymer material and comprise an upwind shell part and a downwind shell part. Due to the size and fragility of these large rotor blades, the blades may be damaged during transport as well as during loading and unloading. Such damages may seriously degrade the performance of the blades. Therefore, the blades need to be carefully packaged in order to ensure that they are not damaged.

However, due to the increasing length of modern wind turbine blades, it is gradually becoming more complicated and expensive to transport the blades. It is not uncommon that the transportation costs amount to 20 percent of the total costs for manufacturing, transporting and mounting the wind turbine blade on the rotor of a wind turbine blade. Also, some blades are transported to the erection site through different modes of transport, such as by truck, train and ship. Some of these modes of transports may have restrictions on large loads, maximum heights, maximum widths, maximum distances between transport frames or supports, for instance dictated by local regulations. Therefore, there exists a logistic problem of providing transport solutions that are suitable for various types of transport.

Overall, there is a demand for making transport solutions simpler, safer and cheaper. In particular, there is a demand for making such systems more flexible such that adaption to a certain transportation situation is possible. This applies for example for shifting from land transport to sea transport. While height restrictions require lowest possible inter-blade spacings, sea transport may require an increased inter-blade spacing to avoid contact between blades during sea disturbance. The prior art shows various solutions for transporting more than one rotor blade using a single container or other packaging system, which is an obvious way to reduce the transport costs. However, the afore-mentioned restrictions and limits may increase the difficulty of transporting a plurality of blades using the same packaging system.

WO 2014/064247 describes a transportation and storage system for at least two wind turbine blades. The system is adapted to stack the blades in an alternating root end to tip end arrangement. The tip end of the second wind turbine blade may extend beyond the root end of the first wind turbine blade, and the tip end of the first wind turbine blade may extend beyond the root end of the second wind turbine blade, when the first and the second wind turbine blades are arranged in the packaging system.

EP1387802 discloses a method and system for transporting two straight wind turbine blades, where the root end of a first blade is arranged in a first package frame, and the tip end of a second, neighbouring blade is arranged in a second package frame that is arranged next to and connected to the first package frame with the effect that the blades are stored compactly alongside each other in a "tip-to-root" arrangement. However, in this transport system the tip end frames support the blades at the very tip of the blades, where they are mechanically most fragile. Further, the package frames are arranged at the root end face and the blade tip. Therefore, the distance between the package frames are approximately equal to the length of the blades. For very long blades of 45 meters or longer, this might not be possible due to local regulations and restrictions on transport.

It is therefore an object of the invention to obtain a new method and system for storing and transporting a plurality of wind turbine blades, which overcome or ameliorate at least one of the disadvantages of the prior art or which provide a useful alternative.

Particularly, it is an object of the invention to provide a more flexible transport solution that is able to accommodate for different transport situations and regulatory requirements.

SUMMARY OF THE INVENTION

In a first aspect, the present invention relates to a modular system for transporting wind turbine blades in at least two different spatial arrangements, each blade having a tip end and a root end, each blade further having a bolt circle diameter D at said root end, the system comprising two or more root end transport frames each having a height H for supporting a root end of a wind turbine blade, wherein H<D, two or more first tip end transport frames each having a height h1 for supporting a portion of a wind turbine blade towards the tip end of said blade, each first tip end transport frame comprising a base frame and a support bracket provided on top of said base frame for receiving a portion of a wind turbine blade, wherein each first tip end transport frame is stackable on top of a root end transport frame and vice versa, such that the modular system is operable to stack successive wind turbine blades in an alternating root end to tip end arrangement, and wherein the modular system further comprises at least one of parts (i), (ii) and (iii):

(i) two or more second tip end transport frames each having a height h2 exceeding h1 for supporting a portion of a wind turbine blade towards the tip end of said blade, each second tip end transport frame comprising a base frame and a support bracket provided on top of said base frame for receiving a portion of a wind turbine blade; wherein each second tip end transport frame is stackable on top of a root end transport frame and vice versa to replace the first tip end transport frames, such that the modular system is operable to stack successive wind turbine blades in an alternating root end to tip end arrangement with two alternative inter-blade spacings resulting from the respective use of either the first or the second tip end transport frames;

(ii) two or more tip end distance pieces each attachable on top of or below a first tip end transport frame, wherein the first tip end transport frame and attached tip end distance piece is stackable on top of the root end transport frame and vice versa, such that the modular system is operable to stack successive wind turbine blades in an alternating root end to tip end arrangement with two alternative inter-blade spacings resulting from the respective use of the first tip end transport frames either with or without the tip end distance pieces; and (iii) at least one root end distance piece having a height h3 and being attachable in between two vertically stacked root end transport frames, wherein (H+h3)≥D, such that the modular system is operable to stack successive wind turbine blades in a root end to root end arrangement as alternative to the root end to tip end arrangement by stacking two or more first or second tip end transport frames at one end and two or more root end transport frames with interposed root end distance pieces at the opposing end.

It has been found that such modular system is inexpensive and offers a high degree of flexibility allowing for transport of two or more wind turbine blades in various spatial arrangements. For example, land transport in a stacked root end to tip end arrangement may be carried out with a minimum inter-blade spacing to minimise height of the overall stack by using the root end transport frames together with a set of first tip end transport frames having a height h1. When the freight is reloaded for subsequent sea transport a stacked root end to tip end arrangement with an increased inter-blade spacing and an increased overall stack height may be accomplished by replacing the first tip end transport frames with the second tip end frames of part (i) having a height h2 which exceeds h1. Reducing overall height is not as much of a concern in sea transport as compared to road transport. Instead, sea transport is potentially more turbulent which necessitates higher inter-blade spacings. A similar effect is obtained when using the tip end distance pieces of part (ii).

Typically, the increased height h2 will be provided by an increased base frame height of each second tip end transport frame as compared to the first tip end transport frames.

While the invention has been described as increasing the height by changing to a new tip end frame having an increased height or using tip end distance piece to increase the inter-blade spacing, it is also recognised that a corresponding technical effect may be achieved by instead changing to a tip end frame having a lower height or providing the tip end frame with a removable tip end distance piece.

In one spatial arrangement a first wind turbine blade may be placed such that the tip end of the first wind turbine blade points in a first direction, and a second wind turbine blade is placed such that the tip end of the second wind turbine blade points in a second direction, which is substantially opposite to the first direction. The tip end of the second wind turbine blade may extend beyond the root end of the first wind turbine blade, and the tip end of the first wind turbine blade may extend beyond the root end of the second wind turbine blade, when the first and the second wind turbine blades are vertically stacked in this arrangement. It is thus apparent that the system is adapted to arranging the first and the second wind turbine blades substantially parallel to each other and pointing tip to root but with an overhang.

The downside of such an arrangement is the increased overall length of the stack. The modular system of the present invention may also address this problem by providing an alternative spatial arrangement. Using part (iii), a root end to root end stack can be provided by arranging the root end distance piece in between two root end transport frames stacked vertically. Thus, the overall length of the stack is reduced in an efficient and simple manner.

Typically, the frames are arranged such that a root end transport frame and at least a portion of a successively-stacked tip end transport frame will overlap with the root end diameter of a wind turbine blade supported by the said root end transport frame, and wherein the tip end transport frame is arranged such that a tip end of a supported pre-bent or swept blade will be spaced from the ground.

Preferably, the modular system comprises part (i). In another embodiment, the modular system comprises part (ii). In yet another embodiment, the modular system comprises part (iii). The modular system may also comprise two of parts (i)-(iii), such as parts (i) and (ii), parts (i) and (iii), or parts (ii) and (iii). In another embodiment, the modular system comprises all three of parts (i), (ii) and (iii).

Preferably, the wind turbine blades are stacked vertically. In one embodiment (H+h3) is within 0.95 to 1.05 times h2; most preferably (H+h3) equals h2. In such embodiments, at root end to root end stack can be provided by using stacked root end transport frames with interposed root end extension pieces at one end and second tip end transport frames at the opposing end without substantially changing the tilt of the wind turbine stack as compared to the root end to tip end stack.

In a preferred embodiment of the modular system, h1 is less than 0.9 times h2. Advantageously, h1 is less than 0.8 times, preferably less than 0.7 times, more preferably less than 0.6 times, and most preferably less than 0.5 times h2.

In another embodiment of the modular system, (H+h3) is at least 1.05 times D, such as at least 1.1 times D, at least 1.15 times D, at least 1.2 times D or at least 1.25 times D.

In another embodiment of the modular system, (0.5 D)<H<(0.9 D), preferably (0.5 D)<H<(0.75 D).

In another embodiment of the modular system, each root end transport frame has a height, a width, and a depth, wherein the width of said root end transport frame is equal to or greater than the bolt circle diameter of a wind turbine blade to be supported by said root end transport frame.

In another embodiment of the modular system each root end transport frame has a height, a width, and a depth, wherein the depth of said root end transport frame is equal to or greater than one quarter of the width of the root end transport frame.

In another embodiment of the modular system each root end transport frame comprises: a frame body and a root end plate coupled to said frame body, said root end plate arranged to couple with a root end of a wind turbine blade, wherein said root end plate is arranged to couple with less than ⅔ of the bolt circle of a root end of a wind turbine blade to support said wind turbine blade on said root end transport frame.

In another embodiment of the modular system said root end plate comprises a substantially C-shaped body arranged to couple with a portion of the bolt circle of a root end of a wind turbine blade.

In another embodiment of the modular system each root end transport frame comprises: a frame body and a root end plate for coupling to the root end of a wind turbine blade, wherein said root end plate is hingedly coupled to said frame body.

In another embodiment of the modular system said root end plate is hingedly coupled to the frame body of said root end transport frame along the horizontal axis.

In another embodiment of the modular system said root end plate is hingedly coupled to the frame body of said root end transport frame along the vertical axis.

In another embodiment of the modular system said root end plate is mounted on at least one bracket arm, said at least one arm coupled to said root end transport frame via a hinged joint.

In another embodiment of the modular system said at least one bracket arm comprises an articulated bracket.

In another embodiment of the modular system said root end transport frame comprises at least a first and a second bracket arm, wherein said first and second bracket arms are positioned on opposed sides of a notional central longitudinal axis of a wind turbine blade to be mounted to said root end plate.

In another embodiment of the modular system said first and second tip end transport frames each comprise a frame body, at least one tip end support bracket for supporting a portion of a wind turbine blade towards the tip end of said blade, wherein a first end of said tip end support bracket is hingedly coupled to said tip end transport frame along the horizontal axis, and wherein a leading edge support lip is provided on said bracket, said leading edge support lip arranged to receive a portion of the leading edge of a wind turbine blade supported by said support bracket, such that the wind turbine blade can be pivotably moved about said hinged coupling relative to said tip end transport frame while supported on said bracket.

In another embodiment of the modular system a second end of said support bracket may be releasably secured to the respective frame bodies of said first and second tip end transport frames when said support bracket is received in said frame body.

In another embodiment of the modular system said tip end support bracket comprises a flexible strap having a support surface provided on said flexible strap.

In another embodiment of the modular system the first and second tip end transport frames further comprises a securing strap to be fitted around a wind turbine blade received in said tip end transport frame.

In another embodiment of the modular system said first and second tip end transport frames are arranged to be positioned at a location toward the tip end of a wind turbine blade to be supported by the modular system, such that a sweep or bend of the wind turbine blade from the location of said tip end transport frame to the tip end of the supported blade is less than respective heights of the base frame of the first and second tip end transport frames.

In another embodiment of the modular system a wind turbine blade to be supported by the modular system has a longitudinal length L, and wherein the first and second tip end transport frames are arranged to be positioned at a distance F from the root end of said blade, wherein $(0.5 L)<F<(0.95 L)$, preferably $(0.6 L)<F<(0.85 L)$.

In another aspect, the present invention relates to the use of the modular system of the present invention for providing a suitable spatial arrangement of at least two wind turbine blades for transport, each blade having a tip end and a root end, by selecting among:

a) an alternating root end to tip end stack with a first inter-blade spacing using at least two root end transport frames and at least two first tip end transport frames, such that the tip end of the first wind turbine blade points in a first direction and the tip end of the second wind turbine blade points in the opposite direction;

b) an alternating root end to tip end stack with a second inter-blade spacing exceeding the first inter-blade spacing using at least two root end transport frames and at least two second tip end transport frames, such that the tip end of the first wind turbine blade points in a first direction and the tip end of the second wind turbine blade points in the opposite direction;

c) an alternating root end to tip end stack using at least two root end transport frames and at least two first tip end transport frames, wherein a tip end distance piece is attached on top of or below each tip end transport frame, such that the tip end of the first wind turbine blade points in a first direction and the tip end of the second wind turbine blade points in the opposite direction;

d) a root end to root end stack using at least two root end transport frames and at least two first or second tip end transport frames, wherein a root end distance piece is attached in between two vertically stacked root end transport frames, such that the tip end of the first wind turbine blade points in the same direction as the tip end of the second wind turbine blade.

Preferably, the first inter-blade spacing is less than 0.9 times the second inter-blade spacing, such as less than 0.8 times or less than 0.7 times the second inter-blade spacing. With a variety of possible shapes, curved surfaces and stacking arrangements, the inter-blade spacing will typically vary over the length of the blades even within a single stack. As used herein, the term "inter-blade spacing" refers to the minimum vertical spacing in between two vertically stacked wind turbine blades.

In yet another aspect, the present invention relates to a transport system for transporting wind turbine blades in at least two different spatial arrangements, each blade having a tip end and a root end, each blade further having a bolt circle diameter D at said root end, the system comprising: two or more root end transport frames each having a height H for supporting a root end of a wind turbine blade, wherein $H<D$; two or more extendible tip end transport frames for supporting a portion of a wind turbine blade towards the tip end of said blade, each extendible tip end transport frame comprising a base frame, at least one vertical extension means for extending the height of the tip end transport frame and a support bracket provided on top of said base frame for receiving a portion of a wind turbine blade; wherein each extendible tip end transport frame is stackable on top of a root end transport frame and vice versa, such that the modular system is operable to stack successive wind turbine blades in an alternating root end to tip end arrangement with at least two alternative inter-blade spacings created by varying the height of the extendible tip end transport frames via the vertical extension means.

Such transport system offers the advantage of providing flexibility in transport situations that require different inter-blade spacings, such as land transport versus sea transport. By extending the height of the tip end transport frames by using the vertical extension means an increased inter-blade spacing can be achieved in an efficient, simple and cost-effective manner.

Preferably, the vertical extension means are suitable for extending the height of the tip end transport frame stagelessly.

In a preferred embodiment, the vertical extension means increase the overall height of the tip end transport frames by at least 5%, more preferred at least 10%, and most preferred at least 20%. It will be understood that the vertical extension means is an integral part of the extendible tip end transport frames. Accordingly, the overall height of the frame may be made up of the height of the base frame, the support bracket and the height of the extension means extending beyond the base frame.

In a preferred embodiment of the transport system, the vertical extension means consists of one or more threaded legs suitable for continuous height adjustment and at least partially received in the base frame of the extendible tip end transport frame.

Such legs may suitably comprise an outer thread, which is received in a fixture comprising a bore with a matching internal thread within the base frame of the extendible tip end transport frame.

In other embodiments, the extension means may comprise extendible elements which form part of the base frame, e.g. telescopic posts provided in each corner of the base frame. In these embodiments, the height of the base frame as such may be increased by the vertical extension means.

Alternatively, a support portion for supporting the tip end of the blade may be movable within the tip end frame, such that the inter-blade spacing may be varied by varying the position of said support portion.

A typical method for transporting or storing at least two wind turbine blades using the modular system or the transport system of the present invention comprises the steps of: a) placing the first wind turbine blade so that the tip end of the first wind turbine blade points in a first direction, b) placing the second wind turbine blade adjacent and in immediate vicinity to the first wind turbine blade so that the tip end of the second wind turbine blade points in a second direction, which is substantially opposite to the first direction. Typically, the second wind turbine blade is in step b) arranged so that the tip end of the second wind turbine blade extends beyond the root end of the first wind turbine blade. The tip end of the first wind turbine blade may also extend beyond the root end of the second wind turbine blade. This will inevitably be the case, if the first wind turbine blade and the second wind turbine blade are of the same length.

Thus, two wind turbine blades may be arranged substantially parallel to each other and oriented in opposite directions. Since the thickness of the blades is typically decreasing from the root end towards the tip end, the blades can with the new "tip-to-root" layout be arranged on top of each other via frames having a relatively small combined cross-section.

According to an advantageous embodiment, the first wind turbine blade and the second wind turbine blade in steps a) and b) are stacked on top of each other, i.e. so that the second wind turbine blade is arranged above the first wind turbine blade. Advantageously, the first wind turbine blade and the second wind turbine blade are arranged so that chordal planes of their respective tip ends are arranged substantially horizontally. By "substantially horizontally" is meant that the chordal plane may vary up to +/−25 degrees to horizontal.

In a preferred embodiment, the blades are arranged so that an upwind side (or pressure side) of the blade is facing substantially downwards.

In a stacking system for storing more than two blades, it is also possible to stack the blades both horizontally and vertically, i.e. in a stacked array.

Typically, the wind turbine blades will have a length of at least 40 meters, or at least 45 meters, or even at least 50 meters. The blades may be prebent so that, when mounted on an upwind configured horizontal wind turbine in a non-loaded state, they will curve forward out of the rotor plane so that the tip to tower clearance is increased.

The first and the second wind turbine blades may be prebent. Such prebent blades may be arranged in the tip end frames and root end frames so that they are straightened slightly or fully during transport, e.g. as shown in WO05005286 by the present applicant. However, the blades need not forcedly be straightened. Since the blades are supported near the ends and the blades are arranged with the upwind side facing downwards, the own weight of the blade may straighten the blades due to the gravitational forces acting on the middle part of the blade.

According to a preferred embodiment, the root end of the first wind turbine blade is arranged in a first root end frame, the root end of the second wind turbine blade is arranged in a second root end frame, the tip end of the first wind turbine blade is arranged in a first tip end frame, and the tip end of the second wind turbine blade is arranged in a second tip end frame.

The tip end frames typically comprise a receptacle for supporting a tip end section. Thus, the first tip end frame comprises a first tip end receptacle, and the second tip end frame comprises a second tip end receptacle. Depending on the particular solution, the receptacle may for instance either support the pressure side of the blade or alternatively the leading edge of the blade. However, in principle the receptacle may also support the suction side of the blade or even the trailing edge of the blade. The frames themselves may be used as lifting tools so that two or more blades may be lifted in one go and without imposing stress to the blades.

In a typical embodiment of the modular system, one first tip end frame with a height h1 is connected, optionally detachably connected, to a root end frame, and another first tip end frame with a height h1 is connected, optionally detachably connected, to another root end frame. After replacing the first tip end frames with the second tip end frames to increase inter-blade spacing, one second tip end frame with a height h2 is connected, optionally detachably connected, to a root end frame, and another second tip end frame with a height h2 is connected, optionally detachably connected, to another root end frame.

In another embodiment of the modular system, one first tip end frame with a height h1 is connected, optionally detachably connected, to a root end frame, and another first tip end frame with a height h1 is connected, optionally detachably connected, to another root end frame. Inter-blade spacing may then be increased by attaching the respective tip end distance piece to each first tip end frame.

In yet another embodiment of the modular system, one first tip end frame with a height h1 is connected, optionally detachably connected, to a root end frame, and another first tip end frame with a height h1 is connected, optionally detachably connected, to another root end frame. To decrease stack length both root end frames are attached on top of each other separated by the root end distance piece with a height h3. The respective root ends of the blade are received in the respective root end frames. Likewise the two first tip end frames are stacked on top of each other on the opposite side to receive the respective tip ends of the blades.

Preferably, the connection parts of the root end frames and the tip end frames that connect to or fix the blade in the frame may be hinged to the frame itself. This can for instance for the root be achieved by connecting a plate to the root of the blade that is hingedly connected to the frame. Similarly, this can be achieved by letting a tip end receptacle be hingedly connected to the tip end frame. Such embodiments have the advantage of alleviating loads that would otherwise be introduced to either the frames or blades due to blade deflections or the like during transport.

In another advantageous embodiment, each root end frame is a root end bracket adapted to be attached to a root end face of a wind turbine blade. This provides a particularly simple solution, where the frame or bracket may be attached to for instance a root end plate of the blade and without having to support the exterior of the blade. Thus, external damages to the outer surface of the blades may more easily be avoided. The tip end frames (with receptacles) may be attached to the brackets, so that the tip end extends beyond the bracket, when the blade is inserted into the tip end frame (and receptacle).

In yet another advantageous embodiment, the connection between root end and tip end frames is an L-shaped or a T-shaped configuration so that a base of the L- or T-shaped configuration is attached to the root end of the first wind turbine blade, and a transversely extending frame part (or extremity) of the L- or T-shaped configuration supports a longitudinal section of the tip end of the second wind turbine blade. Advantageously, the L- or T-shaped configuration is formed so that the base is a root end face bracket attached to the root end face of the first blade, and the transversely extending frame part supports a tip end section of the second blade.

Advantageously, the frame connection is arranged so that the base of the L- or T-configuration is arranged vertically. The transversely extending frame part may be arranged to that it extends from the top or the bottom of the base. In this configuration the second wind turbine blade is arranged on top of the first wind turbine blade. The extremity or transversely extending frame part may thus support either a part of the suction side or the pressure side of the blade in an upwardly facing receptacle. Alternatively, the extremity may extend from the side of the base. In such a configuration, the blades are arranged side-by-side, and the extremity or transversely extending frame part may support either a part of the leading edge or the trailing edge of the blade in an upwardly facing receptacle.

If the blades are arranged so that both blades are facing with the leading edge downwards (in the side-by-side arrangement) or with the upwind shell parts facing downwards (in the vertically stacked arrangement), it is clear that the transversely extending frame parts of the two frame assemblies must be arranged inversely compared to the base frame. Thus, the two frame assemblies have slightly different configurations.

The L- or T-shaped frame assembly has the advantage that the transversely extending frame supports a larger part of the tip sections, thus better alleviating loads and possibly also minimising the necessary overhang of the tip part that extends beyond the root end frame.

In one embodiment, the longitudinal extent of the transversely extending frame part is at least 1 meter, advantageously at least 1.5 meters, more advantageously at least 2 meters. The longitudinal section of the tip end of the blade may be supported along the entire section, or it may be supported in a plurality of discrete sections within the extremity of the L- or T-shaped frame assembly.

As an alternative to the L- or T-shaped frame assembly, the root end frame and the tip end frame may be arranged substantially in the same plane.

Advantageously, a plurality of first wind turbine blades and second wind turbine blades are placed in an array, and wherein the wind turbine blades each comprise a shoulder defining a maximum chord of the blade, and wherein the blades are arranged so that the maximum chord forms an angle of between 20 and 75 degrees to a horizontal plane, advantageously between 22 and 73 degrees. Even more advantageously, the maximum chord forms an angle of between 15 and 35 degrees to a horizontal plane, advantageously between 20 and 30 degrees. It is clear that this stacking method may be advantageous to any configuration of stacking blades side by side with the root end and tip end arranged in the same direction. In a preferred embodiment, it is the root end of the blade that is turned between 15 and 35 degrees to a horizontal plane, advantageously between 20 and 30 degrees. The angle may for instance be defined by bond lines between an upwind shell part and a downwind shell part at the root end of the blade. In this setup, the blades in a stacked array may be arranged so that they slightly overlap with the shoulder of one blade extending partly over an adjacent blade, so that the upwind side of one blade near the shoulder faces down towards the downwind side near the leading edge of an adjacent blade. Thereby, it is possible to stack the blades in frames having a width corresponding to the diameter of the root or only slightly larger, even though the chord length of the shoulder exceeds this diameter.

In another embodiment, intermediate protection members are arranged between the first wind turbine blade and the second wind turbine blade. Advantageously, the intermediate protection members are arranged near the tip end frames so as to provide additional support to a tip end section of the wind turbine blade. The protection means prevent the blades from being damaged due to bending or the blades impacting each other. The intermediate protection members are particularly advantageous, when the blades are stacked on top of each other. In such a setup, the intermediate protection members may be used as support for supporting an additional tip end section of one blade and may transfer loads from the tip end of the upper blade to the mechanically stronger root region of the lower blade. Additional protection members may be arranged below the lowermost blade in a stacked array and a support platform or the ground. The additional protection member is advantageously arranged to support an additional tip end section of the lowermost blade, e.g. near the tip end frame of the lowermost blade. This is particular relevant for embodiment, where the inter-blade spacing is low, thus being particular applicable to embodiments for land transport and storage.

The intermediate protection members may be made of a foamed polymer.

In another embodiment, a root end face of the first wind turbine blade is arranged within 45 meters of a root end face of the second wind turbine blade, advantageously within 42 meters. Accordingly, root end brackets or frames should also be arranged at maximum 45 meters or 42 meters from each other.

Typically, one first tip end frame may be connected, optionally detachably connected, to one root end frame, and another first tip end frame may be connected, optionally detachably connected, to another root end frame.

In one advantageous embodiment, the root end frames are root end brackets adapted to be attached to a root end face of a first wind turbine blade and a second wind turbine blade, respectively. This provides a particularly simple solution, where the frame or bracket may be attached to for instance a root end plate of the blade and without having to support the exterior of the blade. Thus, external damages to the outer surface may more easily be avoided. The first or second tip end frames or the extendible tip end frames (with receptacles) may be attached to the brackets, so that the tip end extends beyond the bracket, when the blade is inserted into the respective tip end frame (and receptacle).

Typically, the tip end of the first wind turbine blade, when arranged in its tip end frame, extends a first longitudinal extent beyond the tip end frame, and the tip end of the second wind turbine blade, when arranged in its tip end frame, extends a second longitudinal extent beyond the tip end frame. In other words, the tip end frames are adapted to package the tip end of a wind blade at a first distance from the tip. The distances will typically be approximately the same. The first longitudinal extent and the second longitudinal extent may be at least 2 meters, advantageously at least 3.5 meters, and more advantageously, at least 5 meters. The blade tip may even extend at least 6, 7, or 8 meters beyond the tip end frame.

In a particular advantageous embodiment, the modular system or the transport system is adapted to stack the first and the second wind turbine blade on top of each other. One tip end frame may for instance be attached to a top of one root end frame, and another tip end frame is attached to a bottom of another root end frame. In this setup the blades are arranged so that chord planes of the tip ends of the blades are arranged substantially horizontally. The setup may be adapted to arrange the blades with an upwind shell part substantially downwards.

In another embodiment, at least a first intermediate protective member is arranged between the first wind turbine blade and the second wind turbine blade. The first intermediate protective member may advantageously be arranged near the tip end of an upper arranged blade of the first wind turbine blade and the second wind turbine blade. Additionally, a second protective member may be arranged below the lower of the two wind turbine blades. In a stacked array, this blade will then also be an intermediate protective member arranged between two blades. Further, a protective member may be arranged below the lowermost blade in the stacked array. The intermediate protective members may be made of a foamed polymer.

It is clear that some of the provided solution may also be used for other configurations of transporting and storing blades, e.g. without the tip overhang.

A typical method for transporting or storing at least two wind turbine blades with the modular system or the transport system of the present invention comprises the steps of:
a) placing the root end of a first wind turbine blade in a root end frame,
b) placing a tip end section of the first wind turbine blade in a tip end frame,
c) placing the root end of the second wind turbine blade in another root end frame,
d) placing a tip end section of the second wind turbine blade in another tip end frame, wherein
the root end frame of step a) and the tip end frame of step d) as well as the tip end frame of step b) and the root end frame of step c) are connected as L-shaped or T-shaped frame assemblies so that bases of the frame assemblies are attached to the root ends of the first and the second wind turbine blade, and extremities of the frame assemblies support a longitudinal section of the tip ends of the first and the second wind turbine blades.

Advantageously, the first wind turbine blade and the second wind turbine blade are arranged such that the maximum chord of the blades form angles of between 15 and 35 degrees to a horizontal plane, advantageously between 20 and 30 degrees, more advantageously around 25 degrees.

It is clear that all the embodiments described with respect to one aspect of the invention also apply to any other aspect of the invention.

Advantageously, by providing the tip end frame with a base height h on top of which the support bracket is located, this allows the base frame to be stacked on top of a preceding root end frame, such that the vertical height of the root end frame and the base frame of the tip end frame are substantially equal to the root end diameter of the supported blade. The height of the tip end base frame is obviously lower than the entire height of the tip end transport frame h1 or h2.

Preferably, $(0.5\ D) < H < (0.9\ D)$.

There is also provided a root end transport frame for a wind turbine blade, the blade having a tip end and a root end, the transport frame having a height, a width, and a depth, wherein the height of the transport frame is less than the bolt circle diameter of a root end of a wind turbine blade to be supported by said transport frame.

A reduced-height transport frame allows for relatively easier handling of the transport frame, and reduces transport and handling costs of the frame when not in use supporting a wind turbine blade.

Preferably, the width of said transport frame is equal to or greater than the bolt circle diameter of a wind turbine blade to be supported by said transport frame.

Preferably, the depth of said transport frame is equal to or greater than one quarter of the width of the transport frame.

Providing a transport frame with such dimensions results in a stable structure with a low centre of mass, and which is able to support a wind turbine blade.

Preferably, the root end transport frame comprises:
a frame body;
a root end plate coupled to said frame body, said root end plate arranged to couple with a root end of a wind turbine blade,
wherein said root end plate is arranged to couple with less than ⅔ of the bolt circle of a root end of a wind turbine blade to support said wind turbine blade on said transport frame.

As the root end plate is designed to support a wind turbine blade by only coupling with a portion of the root end of the wind turbine blade, accordingly the height of the root end plate relative to the bolt circle diameter of the root end of the wind turbine blade may be reduced, resulting in a reduced total height of the root end transport frame.

Preferably, said root end plate comprises a substantially C-shaped body arranged to couple with a portion of the bolt circle of a root end of a wind turbine blade.

There is also provided a root end transport frame for a wind turbine blade, the blade having a tip end and a root end, the transport frame comprising:
a frame body; and
a root end plate for coupling to the root end of a wind turbine blade, wherein said root end plate is hingedly coupled to said frame body.

By providing a hinged root plate, any bending moments due to blade deflection or bending are prevented from being transferred to the frame body. Accordingly, the frame body may be of a relatively lighter construction, as it does not need to bear such relatively large forces.

Preferably, said root plate is hingedly coupled to said frame body along the horizontal axis.

As the angle to the vertical made by the root end of a blade may depend on factors, such as the centre of gravity of the blade and the blade bending properties, accordingly the ability for the root plate to hinge along the horizontal axis allows for different angles of the blade root end to be accommodated by the transport frame.

Additionally or alternatively, said root plate is hingedly coupled to said frame body along the vertical axis.

The hinging of the root plate around the vertical prevents damage to the transport frame due to misalignment or handling issues.

Preferably, said root end plate is mounted on at least one bracket arm, said at least one arm coupled to said transport frame via a hinged joint.

Preferably, said at least one bracket arm comprises an articulated bracket.

The use of an articulated bracket allows for greater degrees of freedom of manipulation of the root plate, to more easily receive and accommodate the root end of a wind turbine blade on the transport frame.

Preferably, said transport frame comprises at least a first and a second bracket arm, wherein said first and second bracket arms are positioned on opposed sides of a notional central longitudinal axis of a wind turbine blade to be mounted to said root end plate.

By positioning the bracket arms on either side of the centre point of the blade root end, the take up of forces from the root end of the blade is balanced in the transport frame.

There is also provided a first tip end transport frame with a height h1 for a wind turbine blade, the blade having a tip end and a root end, the transport frame comprising:
  a frame body;
  a tip end support bracket for supporting a portion of a wind turbine blade towards the tip end of said blade, wherein a first end of said tip end support bracket is hingedly coupled to said transport frame along the horizontal axis; and
  wherein a leading edge support lip is provided on said bracket, said leading edge support lip arranged to receive a portion of the leading edge of a wind turbine blade supported by said support bracket, such that the wind turbine blade can be pivotably moved about said hinged coupling relative to said transport frame while supported on said bracket.

There is also provided a second tip end transport frame with a height h2 for a wind turbine blade, the blade having a tip end and a root end, the transport frame comprising:
  a frame body;
  a tip end support bracket for supporting a portion of a wind turbine blade towards the tip end of said blade, wherein a first end of said tip end support bracket is hingedly coupled to said transport frame along the horizontal axis; and
  wherein a leading edge support lip is provided on said bracket, said leading edge support lip arranged to receive a portion of the leading edge of a wind turbine blade supported by said support bracket, such that the wind turbine blade can be pivotably moved about said hinged coupling relative to said transport frame while supported on said bracket.

By providing a hinged coupling for the support bracket, a wind turbine blade may be adjusted relative to the frame body, to allow for correct positioning of the wind turbine in the transport frame. The leading edge support lip provided on the bracket allows for the partial support of the wind turbine blade, preventing unwanted movement of the wind turbine blade during any such pivoting or subsequent transport.

Preferably, a second end of said support bracket may be releasably secured to said frame body when said support bracket is received in said frame body.

Preferably, said tip end support bracket comprises a flexible strap having a support surface provided on said flexible strap.

The use of a flexible strap as part of the bracket allows for minor adjustments or movements of a supported wind turbine blade to be absorbed through appropriate torsion or twisting of the strap, without being transferred to the relatively rigid frame body. Accordingly, the frame body may be of a more lightweight construction compared to prior art systems.

Preferably, the first and/or the second tip end transport frame further comprises a securing strap to be fitted around a wind turbine blade received in said transport frame.

Preferably, the tip end transport frame is arranged to be positioned at a location toward the tip end of a wind turbine blade to be supported by the transport system, such that a sweep or bend of the wind turbine blade from the location of said tip end transport frame to the tip end of the supported blade is less than height h of the base frame of the tip end transport frame.

The transport system is preferably used in the transport of blades having a pre-bend Δy, and/or swept blades. Accordingly, locating the support bracket of the tip end frame above the horizontal surface by a height h allows for such a curved blade to be supported on the ground without the tip end of the blade striking the ground.

Preferably, the tip end transport frame is arranged to be positioned spaced from the tip end of the blade.

Preferably, a wind turbine blade to be supported by the transport system has a longitudinal length L, wherein the first or second tip end transport frame is arranged to be positioned at a distance F from the root end of said blade, wherein (0.5 L)<F<(0.95 L), preferably (0.6 L)<F<(0.85 L).

Supporting the tip portion of the wind turbine blade at such a location in the outboard portion of the blade, spaced from the tip end, provides a balance between effectively structurally supporting the blade, while reducing the minimum effective wheelbase or support surface needed to support the total transport system.

It will be understood that any of the above-described features may be combined in any embodiment of the transport system as described.

DETAILED DESCRIPTION OF THE INVENTION

Figure 2:
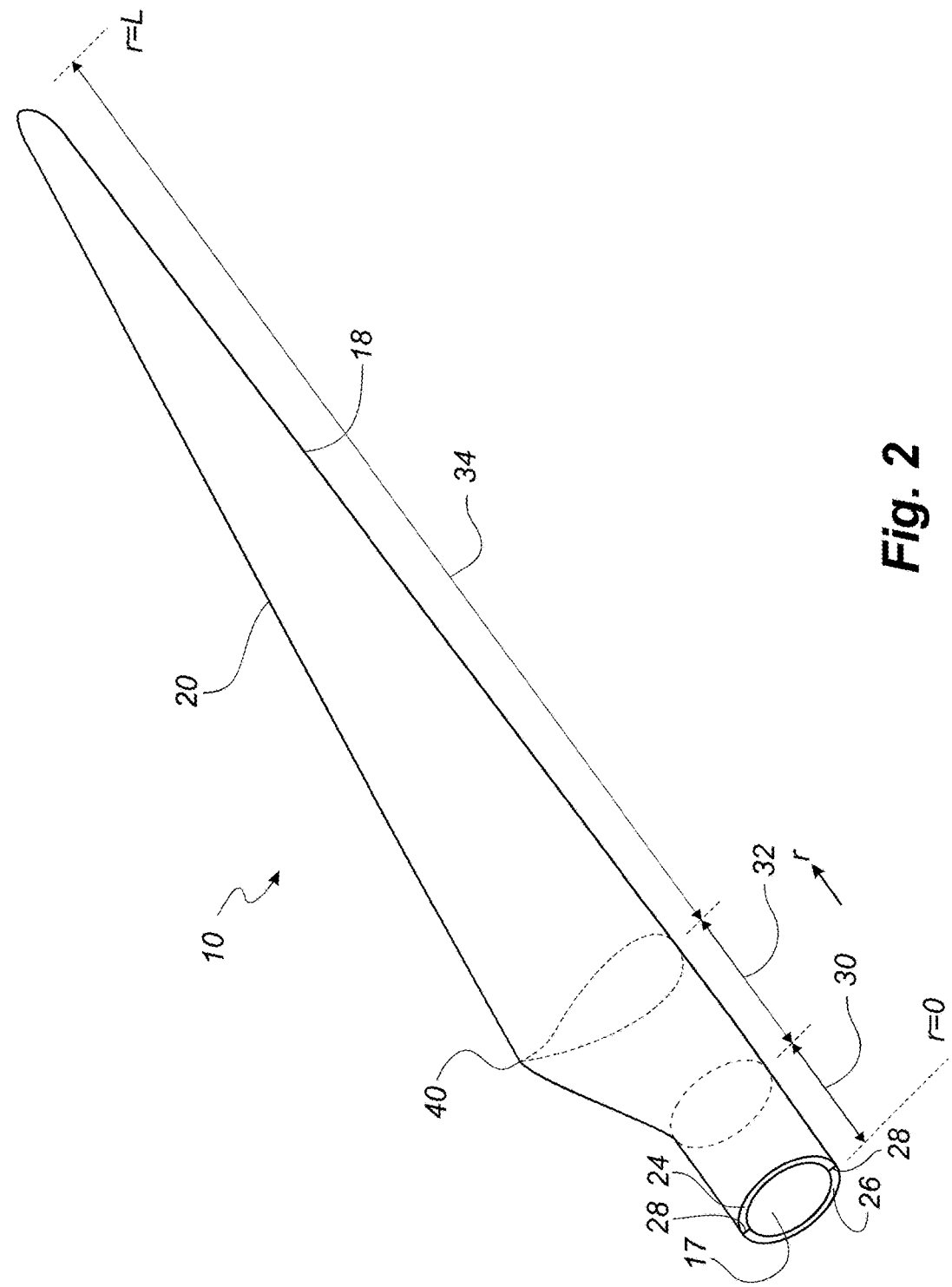
Figure 5:
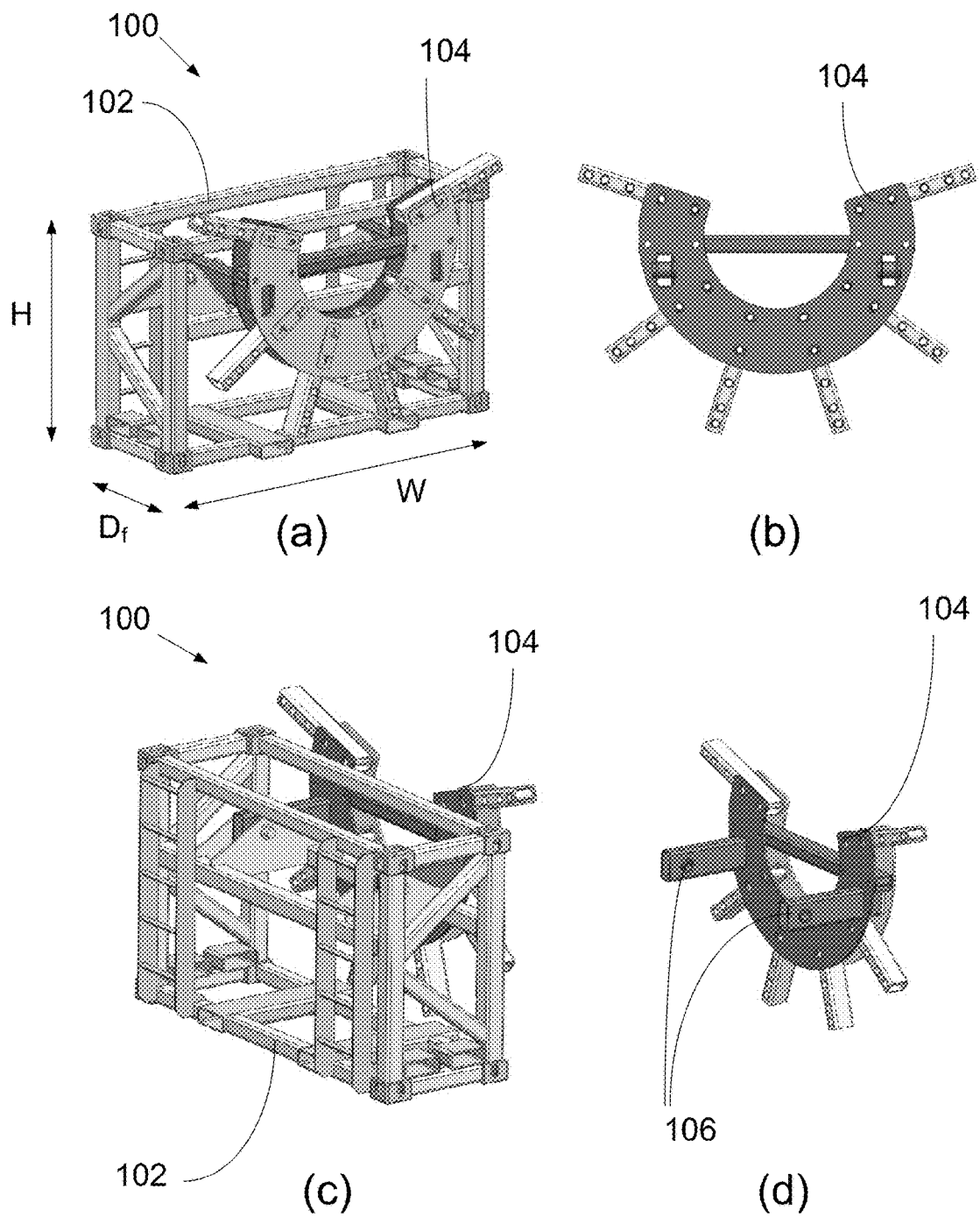
Figure 6:
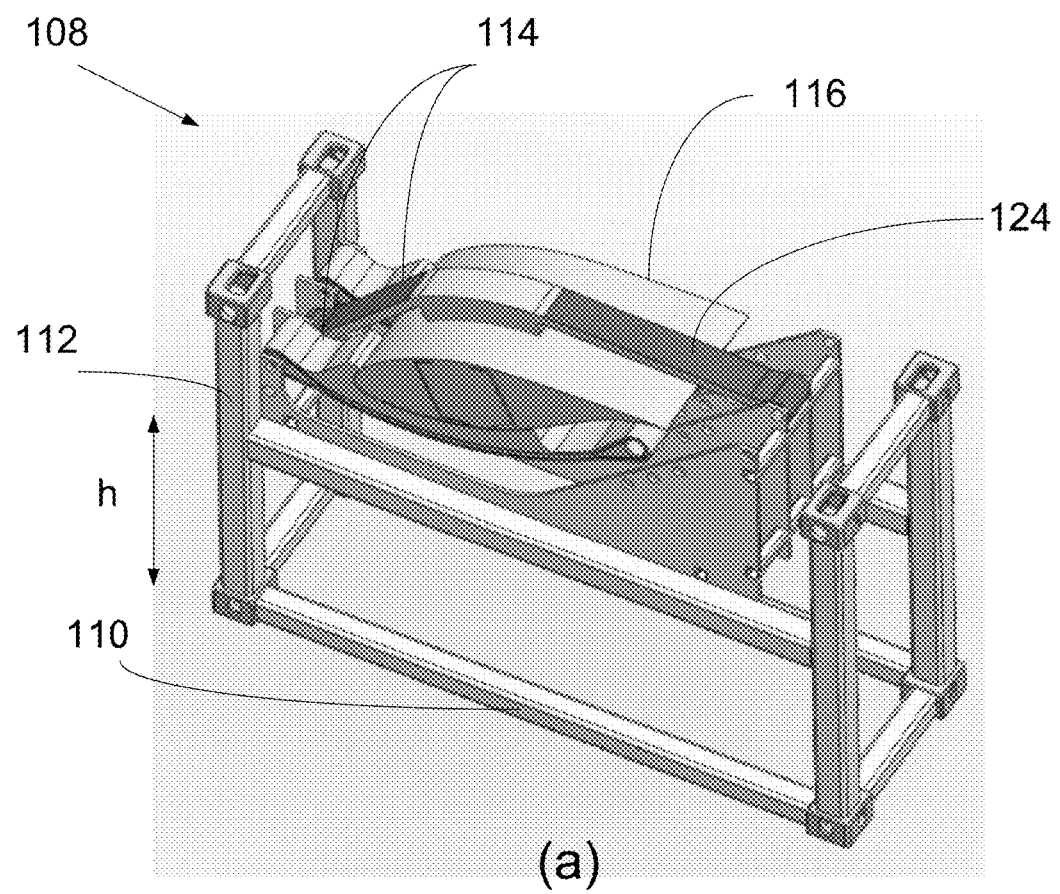
Figure 6:
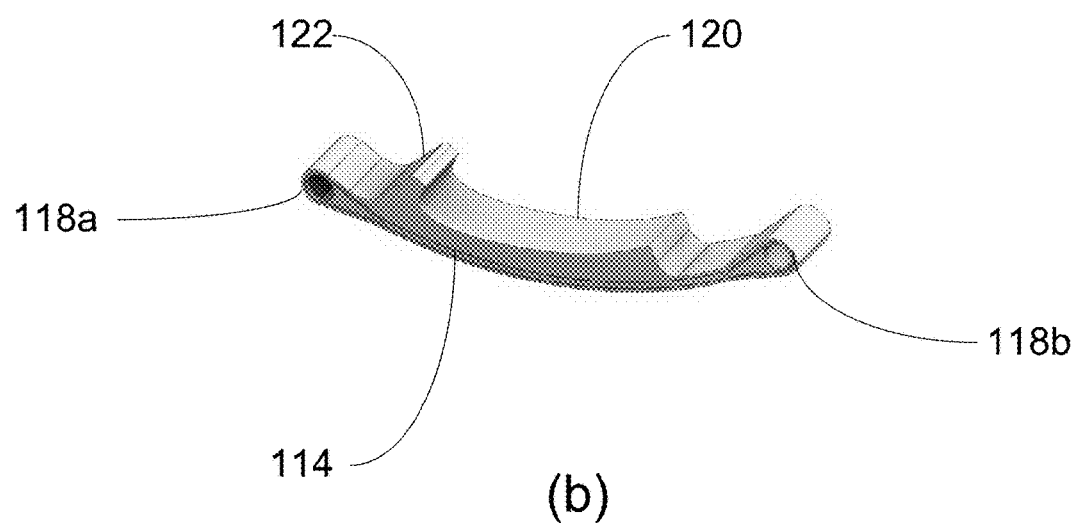
Figure 7:
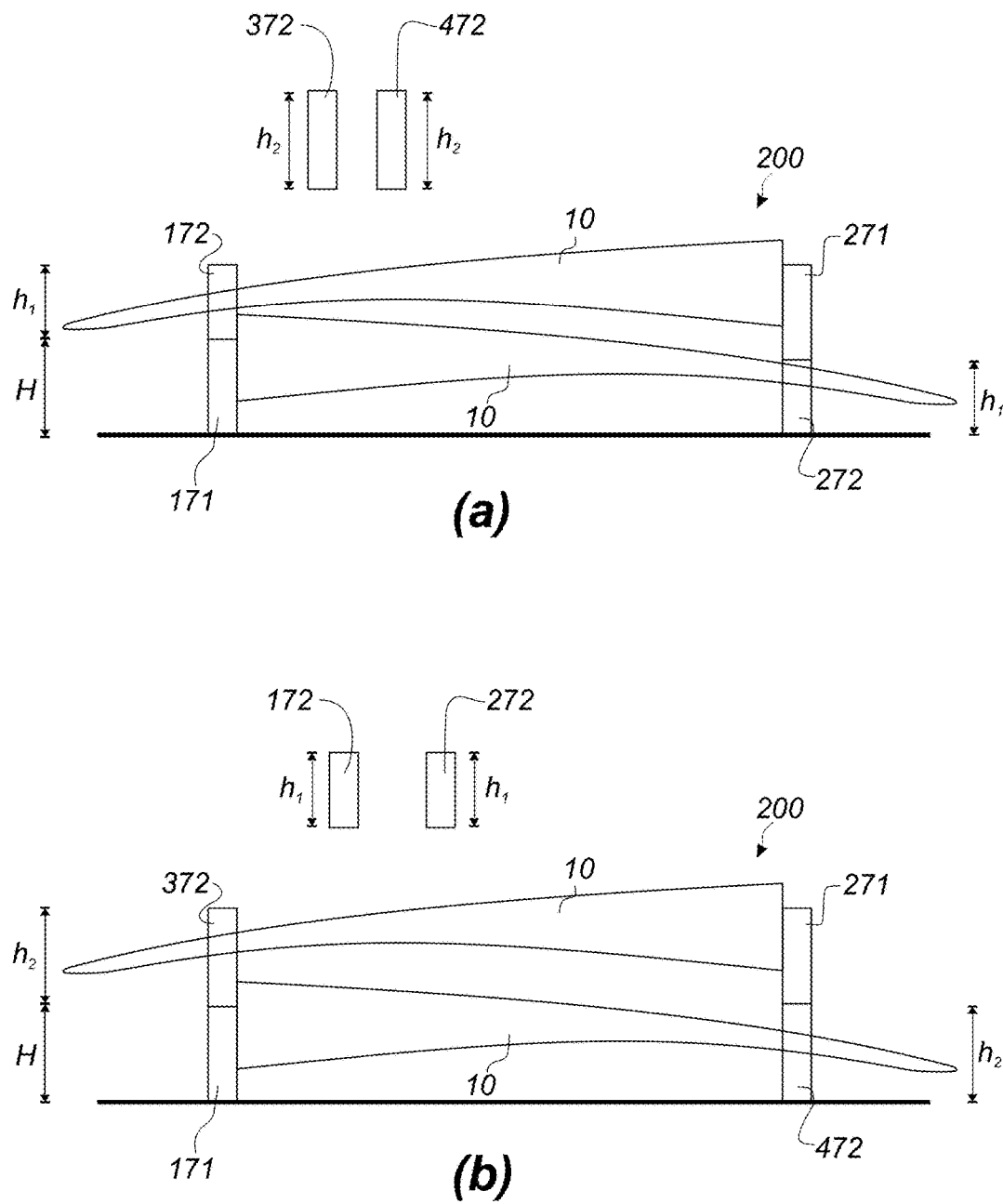
Figure 8:
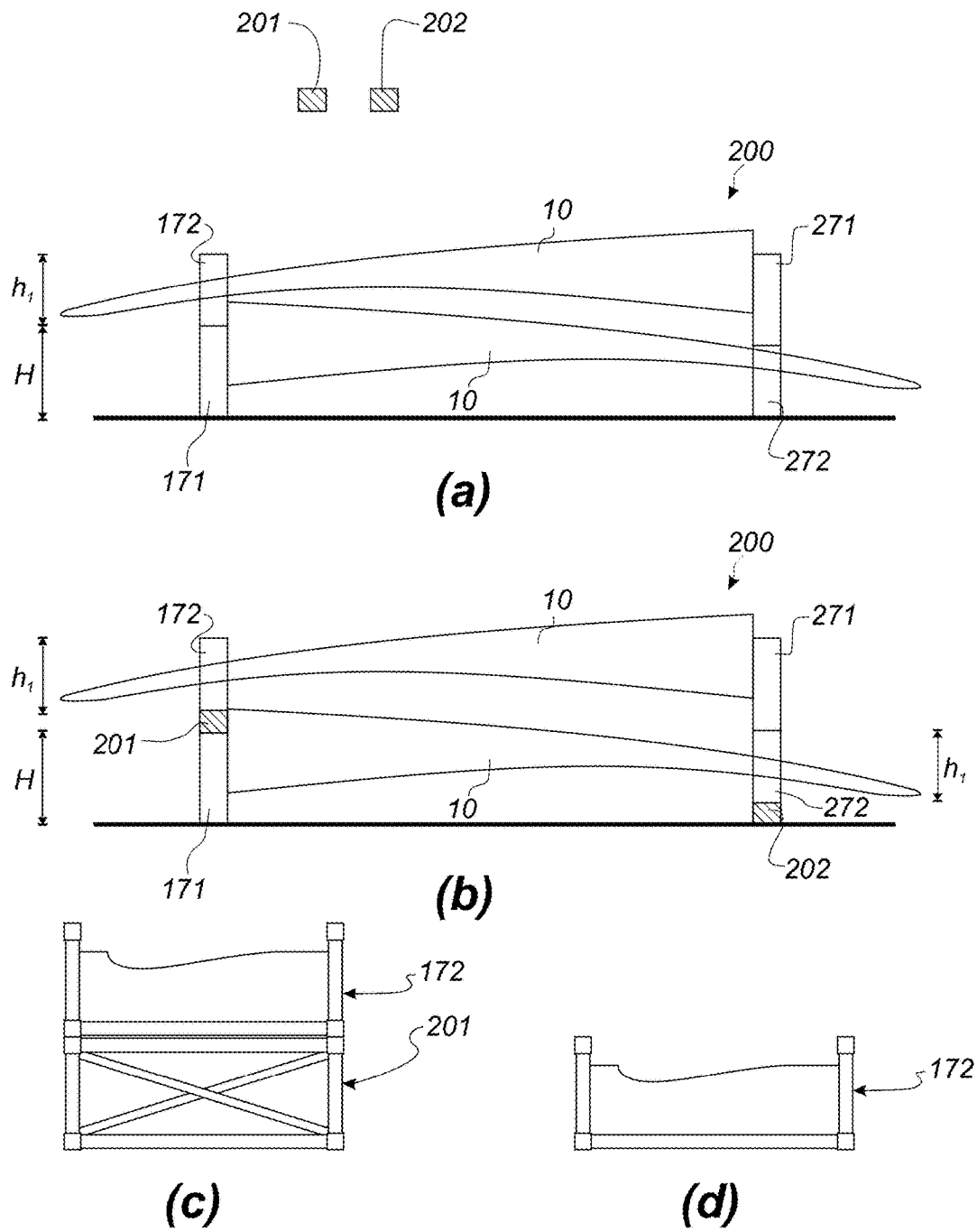
Figure 9:
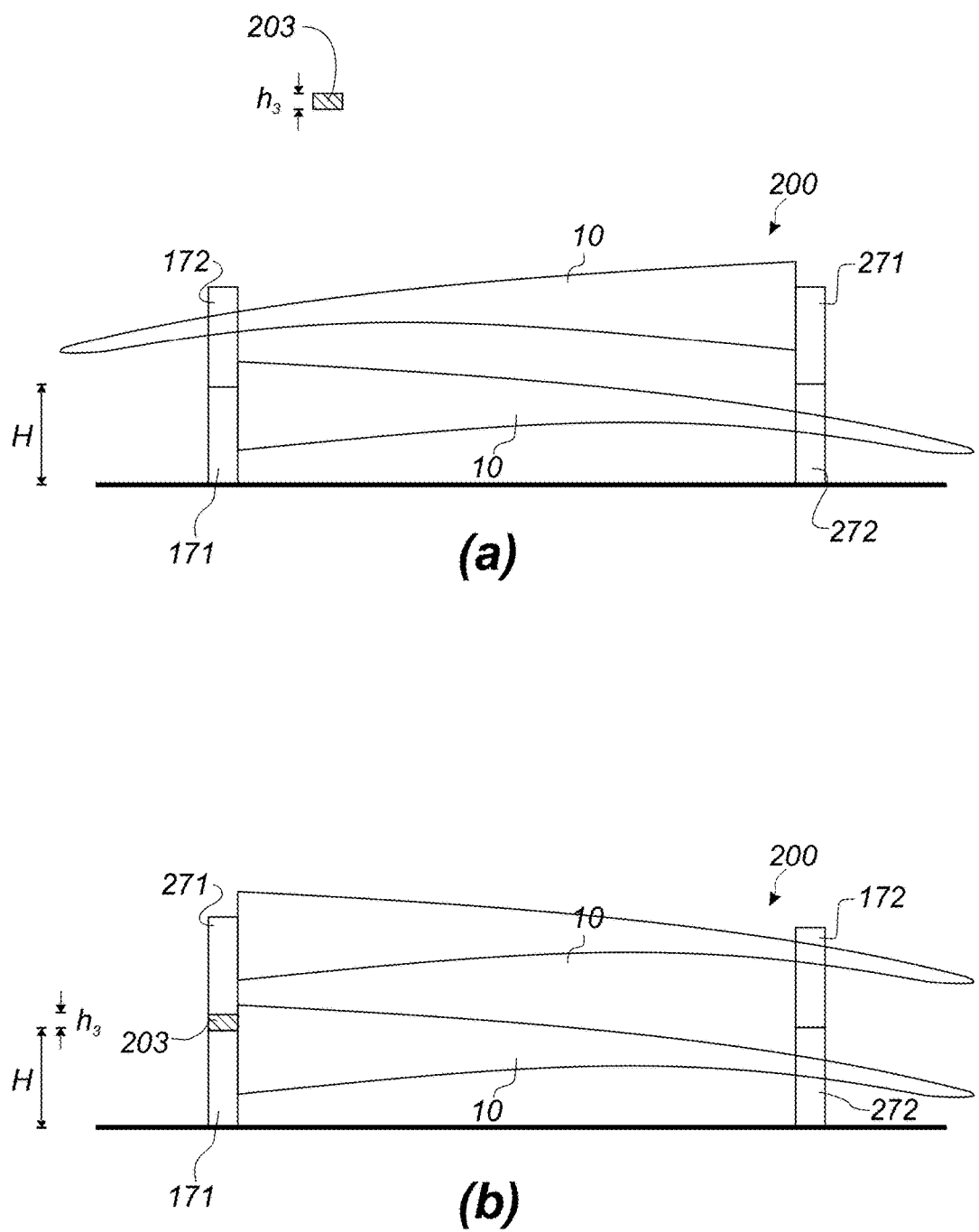
Figure 10:
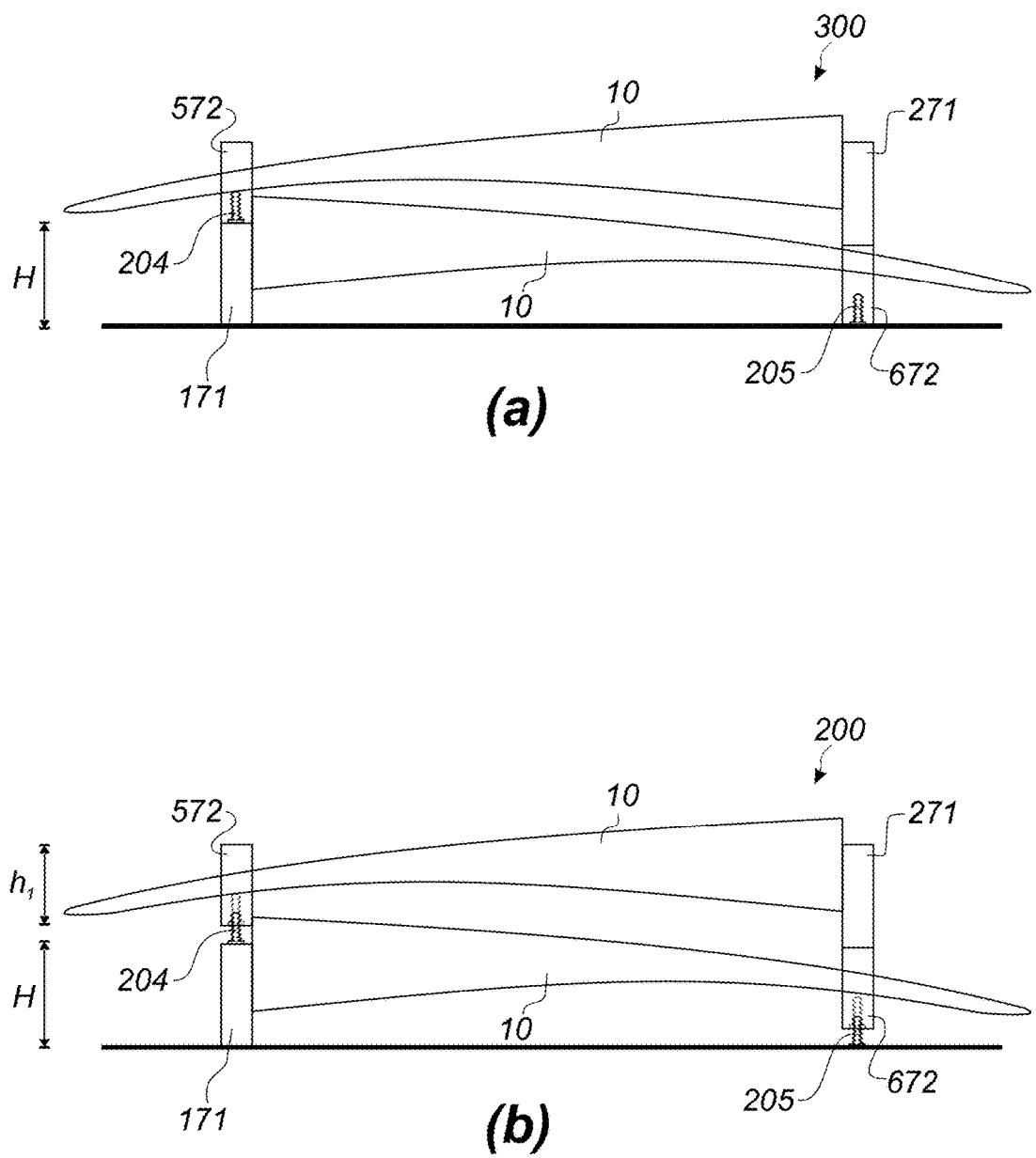

The invention is explained in detail below with reference to embodiments shown in the drawings, in which
  FIG. 1 shows a wind turbine,
  FIG. 2 shows a schematic view of a wind turbine blade according to the invention,
  FIG. 3 shows a schematic view of an airfoil profile,
  FIG. 4 shows a schematic view of the wind turbine blade according to an embodiment of the invention, seen from above and from the side,
  FIG. 5 shows an embodiment of a root end transport frame according to an embodiment of the invention,
  FIG. 6 shows an embodiment of a tip end transport frame according to an embodiment of the invention,
  FIG. 7 shows a side view of an arrangement of wind turbine blades supported by one embodiment of a modular system according to the invention,
  FIG. 8 shows a side view of an arrangement of wind turbine blades supported by another embodiment of a modular system according to the invention,
  FIG. 9 shows a side view of an arrangement of wind turbine blades supported by another embodiment of a modular system according to the invention, and
  FIG. 10 shows a cross-sectional view of an arrangement of wind turbine blades supported by an embodiment of a transport system according to the invention.

The present invention relates to transport and storage of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell made of fibre-reinforced polymer and is typically made as a pressure side or upwind shell part 24 and a suction side or downwind shell part 26 that are glued together along bond lines 28 extending along the trailing edge 20 and the leading edge 18 of the blade 10.

FIGS. 3 and 4 depict parameters, which are used to explain the geometry of the wind turbine blades to be stored and transported according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as X. Further, the blade is provided with a prebend, which is defined as Δy, which corresponds to the out of plane deflection from a pitch axis 22 of the blade.

Blades have over the time become longer and longer and may now exceed a length of 70 meters. The length of the blades as well as the shape of the blades with respect to shoulder, twist and prebending makes it increasingly difficult to transport the blades, in particular if a plurality of blades is to be transported and stored together. The shape and size of the blades also puts limitations on how closely the blades can be stored in a stacked array.

With reference to FIG. 5, an embodiment of a root end transport frame according to an aspect of the invention is indicated generally at 100. The root end transport frame 100 comprises a frame body 102 and a root end plate 104 coupled to the frame body 102. FIG. 5(a) illustrates a front perspective view of the transport frame 100, FIG. 5(b) illustrates a plan view of a root end plate 104 of the transport frame, FIG. 5(c) illustrates a rear perspective view of the transport frame 100, and FIG. 5(d) illustrates a rear perspective view of the root end plate of the frame of FIG. 5(c).

The transport frame 100 is arranged to couple with less than the entire circumference of a bolt circle of a wind turbine blade to be supported by the transport frame, as this provides several advantages in terms of stability, and transport and handling issues.

The transport frame 100 is designed to have a height H less that the bolt circle diameter of the root end of a wind turbine blade to be supported by the transport frame, and preferably to have a width W greater than or equal to said bolt circle diameter. The depth $D_f$ of the frame 100 is designed to adequately support the frame 100, preferably being at least one quarter of the bolt circle diameter distance. Such a construction provides a relatively low centre of mass of the transport frame 100, and reduced the possibility of the frame 100 being easily overturned, either when supporting a root end of a wind turbine blade or when not supporting a blade.

The root end plate 104 is hingedly coupled to the frame body 102, via a pair of projecting bracket arms 106. In the embodiment of FIG. 5, the bracket arms 106 are hinged to the frame body 102 about the horizontal axis, but it will be understood that any suitable hinged joint may be provided, and/or articulated brackets may be provided. The use of a hinged connection between the root end plate 104 and the frame body 102 means that the plate 104 can be provided at any suitable angle to the vertical, to accommodate any bending or deflection of the root end of the wind turbine blade, without transferring such bending moments to the frame body 102. As a result, the frame body 102 may be of a relatively lightweight construction, as it does not have to bear such relatively large bending moments from the blade root end.

Preferably, at least two bracket arms 106 are provided, with the arms 106 arranged to be spaced around the centre point of the root end of a blade supported by said transport frame 100, such that the forces associated with said wind turbine blade are evenly transferred to the supporting frame body 102.

The root end plate 104 is preferably arranged to couple with a subsection of the bolt circle of a wind turbine blade root end, resulting in a reduced height of the total structure of the transport frame 100. The embodiment of FIG. 5 shows the end plate 104 having a substantially C-shaped structure, wherein the plate 104 is operable to couple with approximately ⅔ of the bolt circle of a wind turbine blade root end. The shape and coupling of the root end plate 104 is selected so as to adequately support a root end of a wind turbine blade, while keeping the height of the transport frame 100 structure to a minimum.

It will be understood that any other suitable shape of root end plate 104 may be used, which is arranged to couple with a portion of a bolt circle of a wind turbine blade, e.g. a U-shaped plate, a substantially square plate, etc.

It will be understood that the root end plate 104 may be provided with a plurality of coupling apertures arranged along separate notional bolt circles on the end plate 104, to accommodate the coupling of the root end plate 104 to root ends of different wind turbine blades having different bolt circle diameters. This allows the root end transport frame 100 to be interchangeably used with wind turbine blades of different dimensions.

It will further be understood that the coupling apertures may be shaped to be wider and/or longer than corresponding apertures in the bolt circle of a wind turbine blade, to allow for adjustment of coupling between the root end plate 104 and the blade root end, for example in the event of misalignment, root end ovalisation, etc.

With reference to FIG. 6(a), an embodiment of a tip end transport frame according to an aspect of the invention is indicated generally at 108. The transport frame 108 comprises a base frame 110 and a support portion 112 provided at the top of the base frame 110. The support portion 112 comprises at least one tip end support bracket 114 which is hingedly coupled to the transport frame 108. The support bracket 114 receives a portion of a wind turbine blade (indicated by section 116) to be supported by the tip end transport frame 108, wherein the blade portion is spaced from the tip end of the blade.

With reference to FIG. 6(b), an enlarged view is shown of an example of a tip end support bracket 114. The bracket 114 comprises first and second ends 118a,118b arranged to couple with the support portion 112 of the tip end transport frame 108. The bracket 114 further comprises a cushioning or padding material 120 arranged to support the surface of a wind turbine blade. A leading edge support lip 122 is provided on the bracket 114, preferably projecting from the cushioning or padding material 120. The leading edge support lip 122 is arranged to receive the leading edge of a wind turbine blade supported on the bracket 114, to prevent movement of the blade when on the bracket 114.

In use, a first end 118a of the bracket 114 may be attached to the support portion 112, with the second end 118b projecting free of the frame. A portion 116 of a wind turbine blade can be placed on the bracket 114 with the leading edge of the blade fitted adjacent to said lip 122. The bracket may then be pivoted relative to the transport frame body, to position the blade within the transport frame 108, at which point the second end 118b of the bracket 114 can be secured to the frame 108. A secondary support strap 124 may then be positioned over the surface of the blade section 116 opposed the support bracket 114, and secured to the support portion 112, to securely retain the wind turbine blade within the transport frame 108.

It will be understood that the support bracket 114 may be formed from a relatively flexible strap having a cushioning or padding material 120 and a leading edge support lip 122 moulded onto the strap.

The base frame 110 of the tip end transport frame 108 has a height h. This ensures that the portion 116 of the wind turbine blade is supported at a distance h from the ground or underlying surface. With reference to FIG. 13, this configuration of a transport system for a wind turbine blade provides additional advantages when used for the transportation or storage of pre-bent wind turbine blades, where the wind turbine blades are manufactured to have a curve or bend in a substantially upwind direction, as described in European Patent No. EP1019631.

FIG. 7 is a schematic side view of a first embodiment of a modular system 200 according to the present invention. The modular system comprises two root end transport frames 171, 271 each having a height H, two first tip end transport frames 172, 272 each having a height h1, and two second tip end transport frames 372, 472 each having a height h2 exceeding h1. In FIG. 7(a), the first tip end transport frame 172 is attached on top of root end transport frame 171 at one end, and root end transport frame 271 is attached on top of the other tip end transport frame 272 at the opposing end. Accordingly, two wind turbine blades 10 are vertically stacked in a root end to tip end arrangement, each being supported by one root end transport frame and one tip end transport frame. Two second tip end transport frames 372, 472 are also part of the modular system of this embodiment but are not displayed in use in FIG. 7(a).

FIG. 7(b) shows the same modular system 200 as in FIG. 7(a), however, here the second tip end transport frames 372, 472 are used instead of the first tip end transport frames 172, 272 to increase the inter-blade spacing during transport.

The configuration with lower inter-blade spacing may for instance be used during land transport or storage. Further, intermediate support means (not shown) may be arranged between the blades in order to provide a cushion effect and protect the blades. The configuration with larger inter-blade spacing may for instance be used for sea transport, where the frame system and blades may be subject to turbulence from the sea.

FIG. 8 is a schematic side view of another embodiment of the modular system 200 according to the present invention. The modular system comprises two root end transport frames 171, 271 each having a height H, two first tip end transport frames 172, 272 each having a height h1, and two tip end extension pieces 201, 202. In FIG. 8(a), the first tip end transport frame 172 is attached on top of the root end transport frame 171 at one end, while the root end transport frame 271 is attached on top of the other tip end transport frame 272 at the opposing end. In FIG. 8(a), the tip end extension pieces are not used. By contrast, in FIG. 8(b) the extension piece 201 is attached below the first tip end transport frame 172, and the extension piece 202 is attached below the first tip end transport frame 272 to increase the inter-blade spacing as compared to the arrangement of FIG. 8(a).

While the modular system 200 has been described as a system, where an extension piece 201, 202 is attached to the tip end transport frame 172, 272, it is also recognised that a similar technical effect can be achieved by providing a tip end frame, which has a removable extension piece. This is illustrated in FIGS. 8c and 8d, where FIG. 8c shows a tip end transport frame 172 and a removable extension piece or distance piece 201 (corresponding to the transport or storage shown in FIG. 8b), whereas FIG. 8d shows the tip end transport frame 172 with the removable extension piece 201 removed (corresponding to the transport or storage shown in FIG. 8a). The removable extension piece 201 may for instance have a height of 20-40 cm.

FIG. 9 is a schematic side view of yet another embodiment of the modular system 200 according to the present invention. Again, the modular system 200 comprises two root end transport frames 171, 271 each having a height H, two first tip end transport frames 172, 272 each having a height h1, and two tip end extension pieces 201, 202. In FIG. 9(a), the first tip end transport frame 172 is attached on top of the root end transport frame 171 at one end, while the root end transport frame 271 is attached on top of the other tip end transport frame 272 at the opposing end. Also shown in FIG. 9(a) is a root end extension piece 203 having a height h3. In FIG. 9(b), the root end extension piece is inserted in the stack by attaching it in between the two vertically stacked root end transport frames 171, 271. This enables an alternative spatial arrangement in that the blades 10 can now be stacked in a root end to root end fashion, thus reducing overall stack length and simultaneously minimising the inter-blade spacing.

FIG. 10 is a cross-sectional view of a transport system 300 according to the present invention. The transport system 300 comprises two root end transport frames 171, 271 each having a height H and two extendible tip end transport frames 572, 672. Two wind turbine blades 10 are supported by the transport frames in a root end to tip end vertical stack. Each extendible tip end transport frame 572, 672 contain a threaded leg 204, 205 which is received in bore or a fixture with a matching internal thread within the respective transport frame. In FIG. 10(a) the legs 204, 205 are shown in a retracted position for reduced inter-blade spacing. In FIG. 10(b), the legs 204, 205 are shown in an extended position to increase the overall height of the tip end transport frames 572, 672, thereby increasing inter-blade spacing, e.g. for sea transport.

The invention has been described with reference to preferred embodiments. However, the scope of the invention is not limited to the illustrated embodiments, and alterations and modifications can be carried out without deviating from the scope of the invention that is defined by the following claims.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side shell part/upwind shell part
26 suction side shell part/downwind shell part
28 bond lines
29 horizontal
30 root region
32 transition region
34 airfoil region
50 airfoil profile
52 pressure side/upwind side
54 suction side/downwind side
56 leading edge
58 trailing edge
60 chord
62 camber line/median line
100 root end transport frame
102 frame body
104 root end plate
106 bracket arms
108 tip end transport frame
110 base frame
112 support portion
114 support bracket
116 wind turbine blade portion
118 support bracket end
120 cushioned support material
122 leading edge support lip
124 retaining strap
171 root end transport frame
172 first tip end transport frame
200 modular system
201 tip end extension piece
202 tip end extension piece
203 root end extension piece
204 threaded leg
205 threaded leg
271 root end transport frame
272 first tip end transport frame
300 transport system
372 second tip end transport frame
472 second tip end transport frame
572 extendible tip end transport frame
672 extendible tip end transport frame
c chord length
$d_t$ position of maximum thickness
$d_f$ position of maximum camber
$d_p$ position of maximum pressure side camber
f camber
L blade length
r local radius, radial distance from blade root
t thickness
D blade root diameter
$\Delta y$ prebend
H root end transport frame height
W root end transport frame width
$D_f$ root end transport frame depth
h tip end base frame height
h1 height of first tip end transport frame
h2 height of second tip end transport frame
h3 height of root end distance piece

The invention claimed is:

1. A modular system for transporting wind turbine blades in at least two different spatial arrangements, each blade having a tip end and a root end, each blade further having a bolt circle diameter D at said root end, the system comprising:
   two or more root end transport frames each having a height H for supporting a root end of a wind turbine blade, wherein H<D;
   two or more first tip end transport frames each having a height h1 for supporting a portion of a wind turbine blade towards the tip end of said blade, each said first tip end transport frame comprising a first base frame and a support bracket provided on top of said first base frame for receiving a portion of a wind turbine blade;
   wherein each first tip end transport frame is stackable on top of a root end transport frame of the two or more root end transport frames and vice versa, such that the modular system is operable to stack successive wind turbine blades in an alternating root end to tip end arrangement;
   wherein the modular system further comprises at least one of parts (i), (ii) and (iii):
   (i) two or more second tip end transport frames each having a height h2 exceeding h1 for supporting a portion of a wind turbine blade towards the tip end of said blade, each second tip end transport frame comprising a second base frame and a support bracket provided on top of said second base frame for receiving a portion of a wind turbine blade; wherein each second tip end transport frame is stackable on top of the root end transport frame of the two or more root end transport frames and vice versa to replace the two or more first tip end transport frames, such that the modular system is operable to stack successive wind turbine blades in an alternating root end to tip end arrangement with two alternative inter-blade spacings resulting from the respective use of either the first or the second tip end transport frames;
   (ii) two or more tip end distance pieces each attachable on top of or below a first tip end transport frame of the two or more first tip end transport frames, wherein the first tip end transport frame of the two or more first tip end transport frames and attached tip end distance piece of the two or more tip end distance pieces is stackable on top of the root end transport frame of the two or more root end transport frames and vice versa, such that the modular system is operable to stack successive wind turbine blades in an alternating root end to tip end arrangement with two alternative inter-blade spacings resulting from the respective use of the two or more first tip end transport frames either with or without the tip end distance pieces; and
   (iii) at least one root end distance piece having a height h3 and being attachable in between two vertically stacked root end transport frames of the two or more root end transport frames, wherein (H+h3)≥D, such that the modular system is operable to stack successive wind turbine blades in a root end to root end arrangement as alternative to the root end to tip end arrangement by stacking two or more first tip end transport frames or second tip end transport frames at one end and two or more root end transport frames with interposed root end distance pieces at an opposing end.

2. The modular system of claim 1, wherein h1 is less than 0.9 times h2.

3. The modular system of claim 1, wherein (H+h3) is at least 1.05 times D.

4. The modular system of claim 1, wherein (0.5 D)<H< (0.9 D).

5. The modular system of claim 1, wherein each root end transport frame has a height, a width, and a depth, wherein the width of said root end transport frame is equal to or greater than the bolt circle diameter of a wind turbine blade to be supported by said root end transport frame.

6. The modular system of claim 1, wherein each root end transport frame has a height, a width, and a depth, wherein the depth of said root end transport frame is equal to or greater than one quarter of the width of the root end transport frame.

7. The modular system of claim 1, wherein each root end transport frame comprises:
   a frame body; and
   a root end plate coupled to said frame body, said root end plate arranged to couple with a root end of a wind turbine blade,
   wherein said root end plate is arranged to couple with less than ⅔ of the bolt circle of a root end of a wind turbine blade to support said wind turbine blade on said root end transport frame.

8. The modular system of claim 7, wherein said root end plate comprises a substantially C-shaped body arranged to couple with a portion of the bolt circle of a root end of a wind turbine blade.

9. The modular system of claim 1, wherein each root end transport frame comprises:
   a frame body; and
   a root end plate for coupling to the root end of a wind turbine blade, wherein said root end plate is hingedly coupled to said frame body.

10. The modular system of claim 9, wherein said root end plate is hingedly coupled to the frame body of said root end transport frame along a horizontal axis.

11. The modular system of claim 9, wherein said root end plate is hingedly coupled to the frame body of said root end transport frame along a vertical axis.

12. The modular system of claim 9, wherein said root end plate is mounted on at least one bracket arm, said at least one arm coupled to said root end transport frame via a hinged joint.

13. The modular system of claim 12, wherein said at least one bracket arm comprises an articulated bracket.

14. The modular system of claim 12, wherein said root end transport frame of the two or more root end transport frames comprises at least a first and a second bracket arm, wherein said first and second bracket arms are positioned on opposed sides of a notional central longitudinal axis of a wind turbine blade to be mounted to said root end plate.

15. The modular system of claim 1, wherein said two or more first tip end transport frames and second tip end transport frames each comprise:
   a frame body;
   at least one tip end support bracket for supporting a portion of a wind turbine blade towards the tip end of said blade, wherein a first end of said tip end support bracket is hingedly coupled to said tip end transport frame along a horizontal axis; and
   wherein a leading edge support lip is provided on said bracket, said leading edge support lip arranged to receive a portion of the leading edge of a wind turbine blade supported by said support bracket, such that the wind turbine blade can be pivotably moved about said hinged coupling relative to said tip end transport frame while supported on said bracket.

16. The modular system of claim 15, wherein a second end of said support bracket may be releasably secured to respective frame bodies of said two or more first tip end transport frames and second tip end transport frames when said support bracket is received in said frame body.

17. The modular system of claim 15, wherein said tip end support bracket comprises a flexible strap having a support surface provided on said flexible strap.

18. The modular system of claim 15, wherein the two or more first tip end transport frames and second tip end transport frames further comprises a securing strap to be fitted around a wind turbine blade received in each tip end transport frame.

19. The modular system of claim 1, wherein said first and second tip end transport frames are arranged to be positioned at a location toward the tip end of a wind turbine blade to be supported by the modular system, such that a sweep or bend of the wind turbine blade from the location of each said tip end transport frame to the tip end of the supported blade is less than respective heights of the first and second base frames of the first and second tip end transport frames.

20. The modular system of claim 1, wherein a wind turbine blade to be supported by the modular system has a longitudinal length L, and wherein the first and second tip end transport frames are arranged to be positioned at a distance F from the root end of said blade, wherein (0.5 L)<F<(0.95 L).

21. A method of using a modular system of claim 1 comprising: providing a suitable spatial arrangement of at least two wind turbine blades for transport, each blade having a tip end and a root end, comprising selecting among:
  a) an alternating root end to tip end stack with a first inter-blade spacing using at least two root end transport frames of the two or more root end transport frames and at least two first tip end transport frames of the two or more first tip end transport frames, such that the tip end of a first wind turbine blade points in a first direction and the tip end of a second wind turbine blade points in an opposite direction;
  b) an alternating root end to tip end stack with a second inter-blade spacing exceeding the first inter-blade spacing using at least two root end transport frames of the two or more root end transport frames and at least two second tip end transport frames of the two or more second tip end transport frames, such that the tip end of a first wind turbine blade points in a first direction and the tip end of a second wind turbine blade points in an opposite direction;
  c) an alternating root end to tip end stack using at least two root end transport frames of the two or more root end transport frames and at least two first tip end transport frames of the two or more first tip end transport frames, wherein a tip end distance piece is attached on top of or below each first tip end transport frame, such that the tip end of a first wind turbine blade points in a first direction and the tip end of a second wind turbine blade points in an opposite direction;
  d) a root end to root end stack using at least two root end transport frames of the two or more root end transport frames and at least two first tip end transport frames or second tip end transport frames, wherein a root end distance piece of the at least one root end distance piece is attached in between two vertically stacked root end transport frames, such that the tip end of a first wind turbine blade points in the same direction as the tip end of a second wind turbine blade.

22. The method of claim 21, wherein the first inter-blade spacing is less than 0.9 times the second inter-blade spacing.

23. The modular system of claim 4, wherein (0.5 D)<H<(0.75 D).

24. The modular system of claim 20, wherein (0.6 L)<F<(0.85 L).

* * * * *